United States Patent
Ho et al.

(10) Patent No.: US 12,272,392 B2
(45) Date of Patent: Apr. 8, 2025

(54) MEDIA STRUCTURE WITH SELECTED SEGREGANTS CONFIGURED TO IMPROVE HEAT-ASSISTED MAGNETIC RECORDING

(71) Applicant: Western Digital Technologies, Inc., San Jose, CA (US)

(72) Inventors: Hoan Cong Ho, San Jose, CA (US); Tomoko Seki, Sunnyvale, CA (US); Paul Christopher Dorsey, Los Altos, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/895,566

(22) Filed: Aug. 25, 2022

(65) Prior Publication Data

US 2024/0071416 A1   Feb. 29, 2024

(51) Int. Cl.
*G11B 5/66* (2006.01)
*G11B 5/73* (2006.01)
(Continued)

(52) U.S. Cl.
CPC .............. *G11B 5/66* (2013.01); *G11B 5/7369* (2019.05); *G11B 5/851* (2013.01); *G11B 2005/0021* (2013.01)

(58) Field of Classification Search
CPC ......... G11B 5/66; G11B 5/7369; G11B 5/851; G11B 2005/0021
See application file for complete search history.

(56) References Cited

U.S. PATENT DOCUMENTS 6,537,684 B1   3/2003   Doerner et al.
6,579,590 B2   6/2003   Ju et al.
(Continued)

FOREIGN PATENT DOCUMENTS

CN   104364846 A   2/2015
JP   5925907 B2   5/2016
(Continued)

OTHER PUBLICATIONS

Zhou, Bing et al., "Fabrication of FePt/FePt—BN/FePt—SiOx Granular Film for HAMR Media on Corning Lotus™ NXT Glass Substrate", IEEE Transactions on Magnetics; vol. 58, Issue 2; Feb. 2022; https://ieeexplore.ieee.org/document/9439521; 5 pages.
(Continued)

*Primary Examiner* — Holly Rickman
(74) *Attorney, Agent, or Firm* — LOZA & LOZA, LLP; Gabriel Fitch (57) ABSTRACT

Various apparatuses, systems, methods, and media are disclosed to provide a heat-assisted magnetic recording (HAMR) medium. The HAMR medium includes a substrate, a heat sink layer on the substrate, and a plurality of magnetic recording layers on the heat sink layer. The plurality of magnetic recording layers includes a first magnetic layer and a second magnetic layer disposed on the first magnetic layer. The second magnetic layer includes FePt—Ag—Cu—X, wherein X is a segregant comprising BN. The HAMR medium can use BN-based segregants to improve a thermal gradient of the HAMR medium for better areal density capability (ADC) and enable the use of a MgO underlayer with reduced thickness.

20 Claims, 6 Drawing Sheets

(51) Int. Cl.
  *G11B 5/851* (2006.01)
  *G11B 5/00* (2006.01)

(56) References Cited

U.S. PATENT DOCUMENTS

| | | | |
|---|---|---|---|
| 7,869,162 | B2 | 1/2011 | Lu et al. |
| 8,279,739 | B2 | 10/2012 | Kanbe et al. |
| 8,941,950 | B2 | 1/2015 | Yuan et al. |
| 8,993,134 | B2 | 3/2015 | Varaprasad et al. |
| 9,076,476 | B2 | 7/2015 | Kryder et al. |
| 9,177,585 | B1 | 11/2015 | Seki et al. |
| 9,368,142 | B2 | 6/2016 | Chen et al. |
| 9,530,445 | B1 | 12/2016 | Grobis et al. |
| 9,672,854 | B2 | 6/2017 | Kubota et al. |
| 9,754,618 | B1 | 9/2017 | Srinivasan et al. |
| 9,822,441 | B2 | 11/2017 | Liu et al. |
| 10,127,939 | B2 | 11/2018 | Niwa et al. |
| 10,255,939 | B2 | 4/2019 | Hu et al. |
| 10,276,201 | B1 | 4/2019 | Srinivasan et al. |
| 10,347,281 | B2 | 7/2019 | Arora et al. |
| 10,439,133 | B2 | 10/2019 | Apalkov et al. |
| 10,453,487 | B2 | 10/2019 | Kubota et al. |
| 10,650,854 | B1 | 5/2020 | Yuan et al. |
| 10,923,150 | B2 | 2/2021 | Moriya et al. |
| 11,437,064 | B1 | 9/2022 | Jubert et al. |
| 11,521,648 | B2 * | 12/2022 | Ho ............ G11B 5/73919 |
| 11,521,658 | B2 | 12/2022 | Choi et al. |
| 2007/0148500 | A1 | 6/2007 | Maeda et al. |
| 2010/0255348 | A1 | 10/2010 | Sato et al. |
| 2013/0314815 | A1 | 11/2013 | Yuan et al. |
| 2014/0072828 | A1 | 3/2014 | Inaba et al. |
| 2014/0099517 | A1 | 4/2014 | Hu et al. |
| 2014/0127533 | A1 | 5/2014 | Xiao et al. |
| 2014/0335376 | A1 | 11/2014 | Valaprasad et al. |
| 2014/0376127 | A1 | 12/2014 | Kanbe et al. |
| 2015/0093598 | A1 | 4/2015 | Kubota et al. |
| 2016/0099016 | A1 | 4/2016 | Kubota et al. |
| 2016/0099017 | A1 * | 4/2016 | Hellwig ............ G11B 5/66 428/839.1 |
| 2016/0358622 | A1 | 12/2016 | Arora et al. |
| 2017/0125050 | A1 * | 5/2017 | Kataoka ............ G11B 5/7379 |
| 2018/0040346 | A1 | 2/2018 | Moriya et al. |
| 2018/0218752 | A1 | 8/2018 | Lu et al. |
| 2018/0286441 | A1 | 10/2018 | Lu |
| 2022/0139422 | A1 | 5/2022 | Ho et al. |
| 2023/0005503 | A1 | 1/2023 | Iwanami et al. |
| 2024/0071416 | A1 | 2/2024 | Ho et al. |
| 2024/0096368 | A1 | 3/2024 | Yuan et al. |

FOREIGN PATENT DOCUMENTS

| | | |
|---|---|---|
| JP | 6185591 B2 | 8/2017 |
| JP | 2020164959 A | 10/2020 |
| JP | 2021128811 A | 9/2021 |
| WO | 2014087672 A1 | 6/2014 |
| WO | 2019187243 A1 | 10/2019 |

OTHER PUBLICATIONS

Zhou, Bing et al., "The utilization of boron nitride (BN) for granular L10-FePt HAMR media fabrication", Applied Physics Letters; vol. 118, Issue 16; Apr. 21, 2021; https://aip.scitation.org/doi/10.1063/5.0045901; 6 pages.

Zhou, Bing, "Development of L10-ordered FePt Thin Film for Magnetic Recording Application", Carnegie Mellon University; Materials Science and Engineering; Jun. 23, 2021; https://kilthub.cmu.edu/articles/thesis/Development_of_L10-ordered_FePt_Thin_Film_for_Magnetic_Recording_Application/19229703; 24 pages.

Zhou, Bing et al., "Microstructure Analysis on Size Distribution During Film Growth in HAMR Media", IEEE Transactions on Magnetics; vol. 54, Issue 11; Nov. 2018; https://ieeexplore.ieee.org/document/8360133; 4 pages.

Samad, Mohammed Abdul et al., "A Novel Approach of Carbon Embedding in Magnetic Media for Future Head Disk Interface", IEEE Transactions on Magnetics; vol. 48, Issue 5; May 2012; https://ieeexplore.ieee.org/document/6187782; 6 pages Sepehri-Amin, H. et al., "Microstructure and magnetic properties of FePt-(C,SiO2) granular films deposited on MgO, MgTiO, and MgTiON underlayers", Scripta Materialia; vol. 157; Dec. 2018; https://doi.org/10.1016/j.scriptamat.2018.07.025; 5 pages.

Hung, Shih-Hsuan et al., "First-principles prediction of the morphology of L10 FePt nanoparticles supported on Mg(Ti)O for heat-assisted magnetic recording applications", Physical Review Materials; Jul. 12, 2017; https://journals.aps.org/prmaterials/pdf/10.1103/PhysRevMaterials.1.024405; 6 pages.

Deng, J. Y. et al., "Effect of TiON-MgO intermediate layer on microstructure and magnetic properties of L10 FePt-C-SiO2 films", Journal of Magnetism and Magnetic Materials; vol. 417; Nov. 1, 2016; https://doi.org/10.1016/j.jmmm.2016.05.096; 13 pages.

Tsai, Jai-Lin et al., "Switching Field Distribution in BN/FePtCAg/MgTiON and FePtCAg/MgTiOBN Films", Nanomaterials; Mar. 6, 2022; https://doi.org/10.3390/nano12050874; 13 pages.

Hung, Shih-Hsuan, "Shaping Nanostructure Using Molecules", University of New York; Department of Physics; Dec. 2018; https://etheses.whiterose.ac.uk/23493/1/Shih-Hsuan-Hung-Final-Thesis.pdf; 159 pages.

Ho, Hoan, "Control of Microstructure, Texture and Magnetic Properties of L10FePt Granular Magnetic Recording Media", Carnegie Mellon University; ProQuest Dissertations Publishing; Apr. 2014; https://www.proquest.com/openview/69daf59548ac85e58164e3a80ae83bcb/1?pq-origsite=gscholar&cbl=18750; 24 pages.

Shiroyama, T. et al., "Influence of MgO underlayers on the structure and magnetic properties of FePt-C nanogranular films for heat-assisted magnetic recording media"; AIP Advances; Oct. 2016; https://doi.org/10.1063/1.4964930; 11 pages.

Xu, Baoxi et al., "HAMR Media Design in Optical and Thermal Aspects"; IEEE Transactions on Magnetics; vol. 49, Issue 6; Jun. 2013; https://ieeexplore.IEEE.org/document/6522295; 6 pages.

Choi, Jina et al., "Effects of Single Metal-Ion Doping on the Visible-Light Photoreactivity of TiO2"; American Chemical Society; 2010; https://pubs.acs.org/doi/10.1021/jp908088x; 10 pages.

International Search Report and Written Opinion for International Application No. PCT/US22/27235, dated Aug. 11, 2022, 10 pages.

Tsai, Jai-Lin et al., "Influence of an MgTiTaON Inserted Layer on Magnetic Properties and Microstructure of FePtAgC Films", Coatings; Apr. 8, 2019; https://doi.org/10.3390/coatings9040238; 11 pages.

Hu, J. F. et al., "HAMR Medium Structure Design and its Process for Excellent Thermal Performance", IEEE Transactions on Magnetics; vol. 50, Issue 3; Mar. 2014; https://ieeexplore.IEEE.org/document/6774999; 6 pages.

Jubert, Pierre-Olivier et al., "Optimizing the Optical and Thermal Design of Heat-Assisted Magnetic Recording Media", IEEE Transactions on Magnetics; vol. 53, Issue 2; Feb. 2017; https://ieeexplore.ieee.org/document/7556254; 9 pages.

Pandey, H. et al., "Structure Optimization of FePt-C Nanogranular films for Heat Assisted Magnetic Recording Media"; IEEE Transactions on Magnetics; vol. 52, Issue 2; Feb. 2016; https://ieeexplore.ieee.org/document/7247737; 8 pages.

Hono, Kazuhiro, "FePt Nanogranular films for high density heat-assisted magnetic recording", Microelectronics & Nanoelectronics; 2022 Merck KGaA; Darmstadt, Germany; accessed Feb. 5, 2022; https://www.sigmaaldrich.com/us/en/technical-documents/technical-article/materials-science-and-engineering/microelectronics-and-nanoelectronics/fept-nanogranular-films; 4 pages.

Xu, Chengchao et al., "Understanding the Growth of High-Aspect-Ratio Grains in Granular L10-FePt Thin-Film Magnetic Media", APL Materials; May 2022; vol. 10, Issue 5; https://pubs.aip.org/aip/apm/article/10/5/051105/2834965/Understanding-the-growth-of-high-aspect-ratio; 17 pages.

Hu, J.F. et al., "Microstructure and Magnetic Properties of FePt-SiO2 Perpendicular Recording Media", Physica Status Solidi A:

(56) References Cited

OTHER PUBLICATIONS

Applications and Materials Science; Oct. 2008; vol. 205, Issue 10; https://onlinelibrary.wiley.com/doi/abs/10.1002/pssa.200723037; 6 pages.

Granz, Steven D. et al., "Granular L10 FePt:X (X = Ag, B, C, SiOx, TaOx) Thin Films for Heat Assisted Magnetic Recording", The European Physical Journal B; Mar. 2013; vol. 86, Article 81; http://dx.doi.org/10.1140/epjb/e2012-30655-3; 7 pages.

Wei, D.H. et al., "Effects of SiO2 Inserted Layers on the Structure and Magnetic Properties of FePt (0 0 1) Films", Journal of Magnetism and Magnetic Materials; Sep. 2006; vol. 304, Issue 1; https://www.sciencedirect.com/science/article/abs/pii/S0304885306002629; 3 pages.

Yang, En et al., "L10 FePt-Oxide Columnar Perpendicular Media with High Coercivity and Small Grain Size", Journal of Applied Physics; Jul. 2008; vol. 104, Issue 2; https://pubs.aip.org/aip/jap/article-abstract/104/2/023904/934485/L1-FePt-oxide-columnar-perpendicular-media-with?redirectedFrom=fulltext; 3 pages.

Chen, S.C. et al., "Granular FePt-Ag Thin Films with Uniform FePt Particle Size for High-Density Magnetic Recording", Materials Science and Engineering: B; Jan. 2002; vol. 88, Issue 1; https://www.sciencedirect.com/science/article/abs/pii/S0921510701009151; 7 pages.

\* cited by examiner

MEDIA STRUCTURE WITH SELECTED SEGREGANTS CONFIGURED TO IMPROVE HEAT-ASSISTED MAGNETIC RECORDING

FIELD

The disclosure relates, in some aspects, to magnetic recording media for use with heat-assisted magnetic recording, and more particularly, to a media structure with selected segregants configured to improve heat-assisted magnetic recording (HAMR).

INTRODUCTION

Magnetic storage systems, such as a hard disk drive (HDD), are utilized in a wide variety of devices in both stationary and mobile computing environments. Examples of devices that incorporate magnetic storage systems include desktop computers, portable notebook computers, portable hard disk drives, digital versatile disc (DVD) players, high definition television (HDTV) receivers, vehicle control systems, cellular or mobile telephones, television set-top boxes, digital cameras, digital video cameras, video game consoles, network storage systems, and portable media players.

A typical disk drive includes magnetic storage media in the form of one or more flat disks. The disks are generally formed of two main substances, namely, a substrate material that gives it structure and rigidity, and a magnetic media coating that holds the magnetic impulses or moments that represent data in a recording layer within the coating. The typical disk drive also includes a read head and a write head, generally in the form of a magnetic transducer which can sense and/or change the magnetic fields stored on the recording layer of the media.

Energy-assistant magnetic recording (EAMR) systems can increase the areal density of information recorded magnetically on various magnetic media. To achieve higher areal density for magnetic storage, smaller magnetic grain size (e.g., less than 6 nm) media may be used. Heat-assisted magnetic recording (HAMR) is an example of EAMR. In HAMR, high temperatures are applied to the recording media during writing to facilitate recording to small magnetic grains. In some examples, one or more magnetic layers of a HAMR medium can contain segregation materials (e.g., carbon) and an underlayer. The thickness of the underlayer (e.g., a MgO layer) can affect media thermal gradient and magnetic film growth.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one embodiment, a magnetic recording medium includes a substrate, a heat sink layer on the substrate, and a plurality of magnetic recording layers on the heat sink layer. The plurality of magnetic recording layers includes a first magnetic layer and a second magnetic layer disposed on the first magnetic layer. The second magnetic layer includes FePt—Ag—Cu—X, wherein X is a segregant including BN.

In one embodiment, a data storage device includes the magnetic recording medium, and a write head configured to write data to the magnetic recording medium, and the write head includes a near field transducer (NFT).

In one embodiment, a method for manufacturing a magnetic recording medium is provided. The method includes providing a substrate and providing a heat sink layer on the substrate. The method further includes providing a plurality of magnetic recording layers on the heat sink layer. The plurality of magnetic recording layers includes a first magnetic layer and a second magnetic layer disposed on the first magnetic layer. The second magnetic layer includes FePt—Ag—Cu—X, wherein X is a segregant comprising BN.

In one embodiment, a magnetic recording medium includes a substrate, a heat sink layer on the substrate, and a plurality of magnetic recording layers on the heat sink layer. The plurality of magnetic recording layers include a first magnetic layer and a second magnetic layer disposed on the first magnetic layer. The second magnetic layer includes FePt—Ag—Cu—X, wherein X is a segregant comprising B4C.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In a similar fashion, while certain implementations may be discussed below as device, system, or method implementations, it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which.

DETAILED DESCRIPTION

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects of like elements.

The disclosure relates in some aspects to various apparatuses, systems, methods, and media for providing magnetic recording media that may be used for, e.g., heat-assisted magnetic recording (HAMR). In some aspects, a HAMR medium has a magnetic layer design that can achieve high areal density using a BN-based segregant in a magnetic layer. In some embodiments, the HAMR medium has multiple magnetic recording layers, and at least one of the magnetic recording layers uses a BN-based segregant. To achieve higher areal density, the thickness of a MgO underlayer or seed layer needs to be reduced in order to increase the thermal gradient of the media. However, the underlayer or seed layer also needs to have sufficient thickness for proper magnetic film growth. In some embodiments, the HAMR medium has a bilayer underlayer (e.g., MgO/MgO-TiO underlayer) with a thickness designed to provide an effective thermal gradient for high areal density and proper magnetic grain growth.

Figure 1:
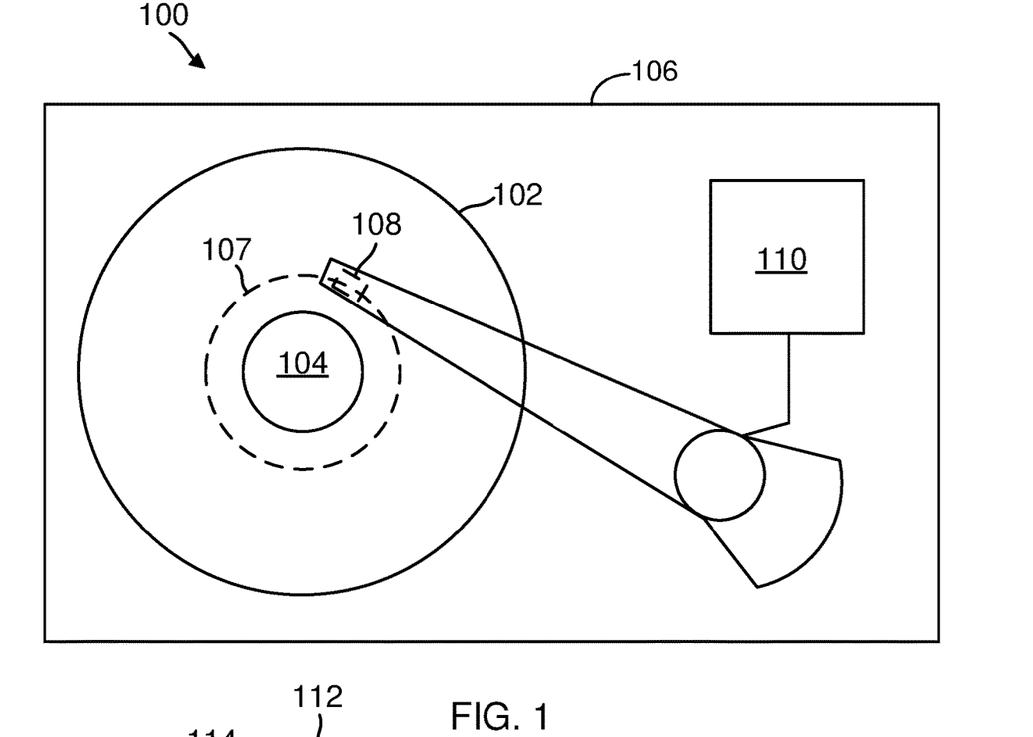
FIG. 1 is a top schematic view of a disk drive configured for energy-assisted magnetic recording (EAMR) including a slider and an EAMR medium in accordance with one aspect of the disclosure.

FIG. 1 is a top schematic view of a data storage device 100 (e.g., disk drive or magnetic recording device) configured for energy-assisted magnetic recording (EAMR) comprising a slider 108 and a magnetic recording medium 102 according to one or more aspects of the disclosure. The magnetic recording medium 102 has a magnetic layer design that can use BN-based segregants. For simplicity of illustration, the various embodiments of magnetic recording medium will be described in this disclosure as usable for heat-assisted magnetic recording (HAMR), though they are not limited to HAMR or EAMR only and can be used for non-EAMR type magnetic recording. A laser (not visible in FIG. 1 but see 114 in FIG. 2) is positioned with a head/slider 108. Disk drive 100 may include one or more disks/media 102 to store data. Disk/medium 102 resides on a spindle assembly 104 that is mounted to a drive housing 106. Data may be stored along tracks in the magnetic recording layer of disk 102. The reading and writing of data is accomplished with the head 108 (slider) that may have both read and write elements (108a and 108b). The write element 108 a is used to alter the properties of the magnetic recording layer of disk 102 and thereby write information thereto. In one aspect, head 108 may have magneto-resistive (MR) based elements, such as tunnel magneto-resistive (TMR) elements for reading, and a write pole with coils that can be energized for writing. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an example HAMR system is shown, the various embodiments described may be used in other EAMR or non-EAMR magnetic data recording systems, including perpendicular magnetic recording (PMR) disk drives.

Figure 2:
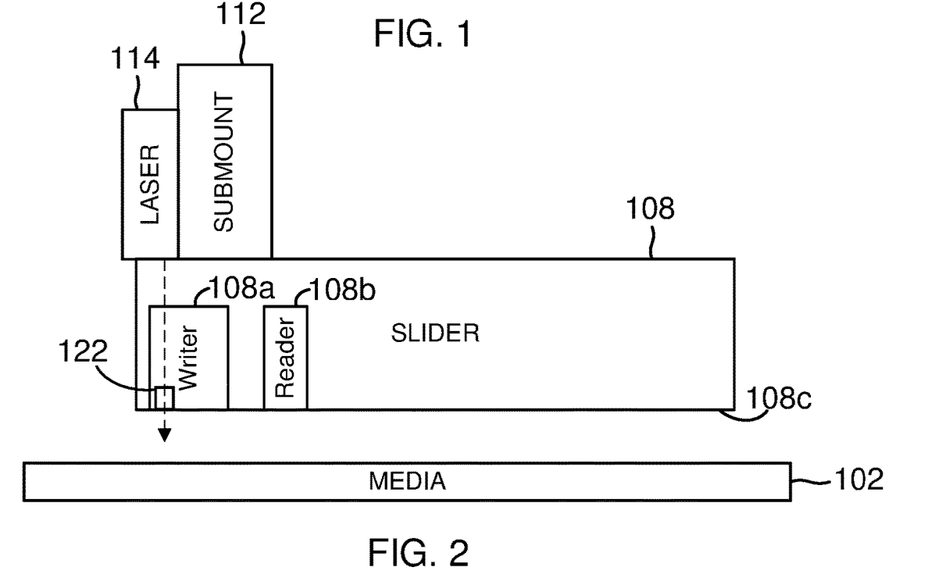
FIG. 2 is a side schematic view of the slider and EAMR medium of FIG. 1 in accordance with one aspect of the present.

FIG. 2 is a side schematic view of the slider 108 and magnetic recording medium 102 of FIG. 1. The magnetic recording medium 102 may have one or more layers (e.g., media shown in FIG. 3) that include a magnetic recording layer using BN-based segregants in accordance with one or more aspects of the disclosure. The slider 108 may include a sub-mount 112 attached to a top surface of the slider 108. The laser 114 may be attached to the sub-mount 112, and possibly to the slider 108. The slider 108 comprises a write element (e.g., writer) 108a and a read element (e.g., reader) 108b positioned along an air bearing surface (ABS) 108c of the slider for writing information to, and reading information from, respectively, the magnetic recording medium 102.

In operation, the laser 114 is configured to generate and direct light energy to a waveguide (e.g., along the dashed line) in the slider which directs the light to a near field transducer (NFT) 122 near the air bearing surface (e.g., bottom surface) 108c of the slider 108. Upon receiving the light from the laser 114 via the waveguide, the NFT 122 generates localized heat energy that heats a portion of the media 102 within or near the write element 108a, and near the read element 108b. The anticipated recording temperature can be in the range of about 350° C. to 400° C. In the aspect illustrated in FIG. 2, the laser-directed light is disposed within the writer 108a and near a trailing edge of the slider. In other aspects, the laser-directed light may instead be positioned between the writer 108a and the reader 108b. FIGS. 1 and 2 illustrate a specific example of a HAMR system. In other examples, the magnetic recording medium 102 according to aspects of the disclosure can be used in other suitable HAMR systems (e.g., with other sliders configured for HAMR).

Some aspects of the disclosure provide a HAMR medium and a method of fabricating the HAMR medium with a magnetic recording layer using BN-based segregants. In some aspects, one or more magnetic recording layers of the HAMR medium can use BN-based segregants that can improve a thermal gradient of the HAMR medium for better areal density capability (ADC) and enable the use of a MgO underlayer with reduced thickness.

Figure 3:
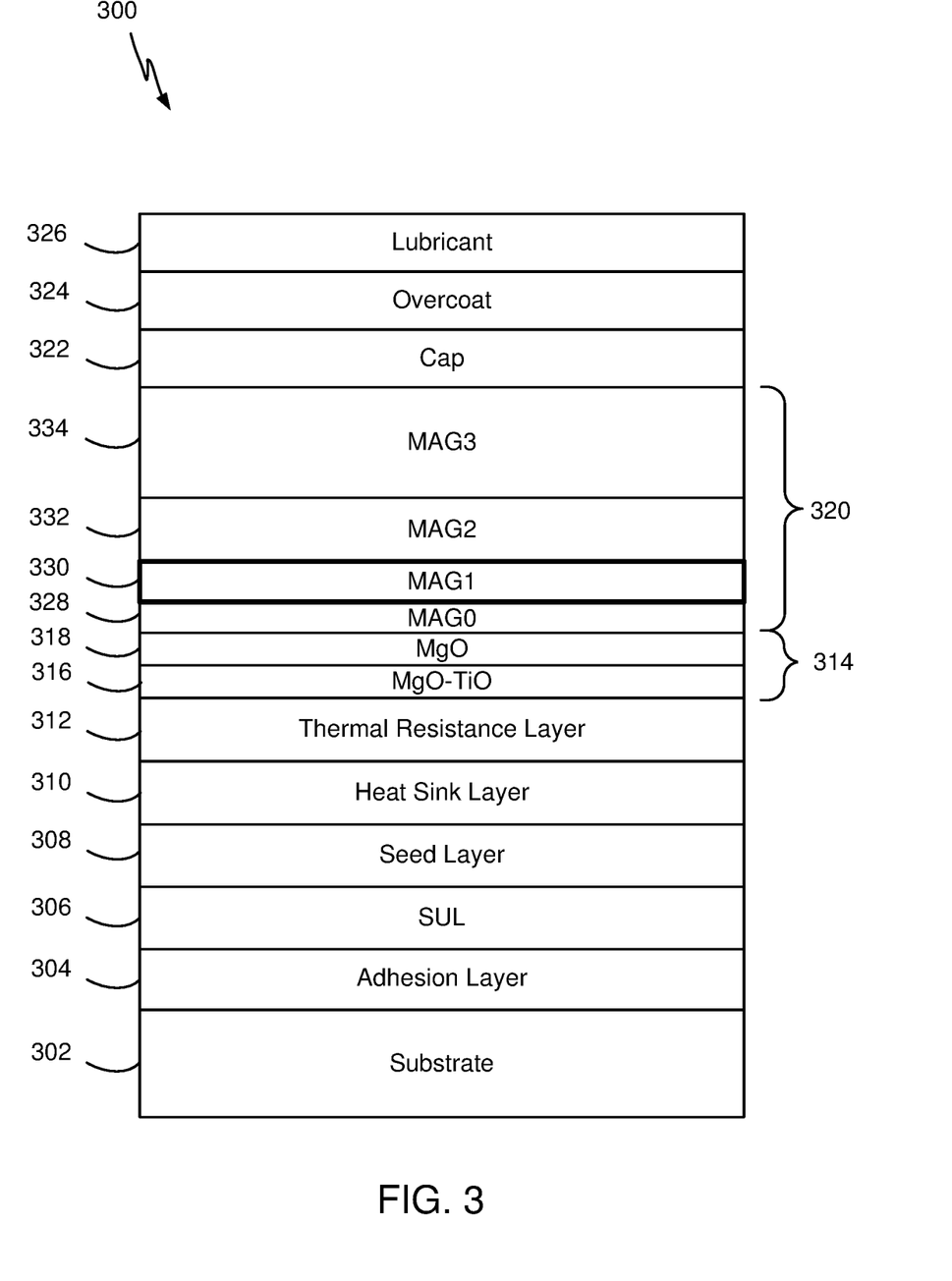
FIG. 3 is a side schematic view of a HAMR medium in accordance with one aspect of the disclosure.

FIG. 3 is a side schematic view of a HAMR medium 300 using BN-based segregants in accordance with some aspects of the disclosure. The HAMR medium 300 has a stacked structure with a substrate 302 at a bottom/base layer, an adhesion layer 304 on the substrate 302, a soft underlayer (SUL) 306 on the adhesion layer 304, a seed layer 308 on the SUL 306, a heat sink layer 310 on the seed layer 308, a thermal resistance layer (TRL) 312 on the heat sink layer 310, an underlayer structure 314 on the TRL 312. In one example, the underlayer structure 314 may include a first underlayer (e.g., MgOTiO (MTO) layer 316) on the TRL 312, and a second underlayer (e.g., MgO layer 318) on the first underlayer (MTO 316). In some embodiments, the underlayer 314 structure may be replaced with the MTO layer 316 without a MgO layer. In some examples, the MTO layer 316 may have a thickness between about 1.3 nanometers (nm) and about 3.5 nm. In some examples, the MgO layer 318 may have a thickness between about 1.1 nm and about 2.3 nm (e.g., about 1.7 nm). The HAMR medium 300 further includes a multi-layer magnetic recording layer (MRL) structure 320 on the underlayer structure 314, a capping layer 322 on the MRL structure 320, and an overcoat layer 324 on the capping layer 322. In some examples, the HAMR medium 300 can have a lubricant layer 326 on the overcoat layer 324. In some aspects, one or more layers (e.g., underlayer structure 314 and MRL structure 320) of the HAMR medium 300 can be deposited (e.g., sputtering) using a reactive gas.

In some aspects, the substrate 302 may be made of one or more materials such as an Al alloy, NiP plated Al, glass, glass ceramic, combinations thereof, and/or other suitable materials known in the art. In some aspects, the adhesion layer 304 may be made of NiTa and/or other suitable materials known in the art. In some aspects, the SUL 306 may have a high permeability, high saturation magnetization, and low coercivity such as NiFe, CoNbB, FeAlSi, CoFeB, FeTaN, FeTaC, and CoFe, or other suitable materials known in the art. In some aspects, the seed layer 308 may be made of RuAl and/or other suitable materials known in the art.

In some aspects, the heat sink layer 310 may be made of one or more materials such as Ag, Al, Au, Cu, Cr, Mo, Ru, W, CuZr, MoCu, AgPd, CrRu, CrV, CrW, CrMo, CrNd, NiAl, NiTa, combinations thereof, and/or other suitable materials known in the art. In some aspects, the thermal resistance layer 312 can be made of RuAl, RuAlCrO2, and/or other suitable materials known in the art. In one example, the thermal resistance layer 312 may have a thickness of about 2 nm.

As illustrated, the MRL structure 320 includes four magnetic recording layers (MAG0, MAG1, MAG 2, MAG 3). In some examples, these sub-layers or magnetic recording layers of the MRL structure 320 may be made of FePt or an alloy selected from FePtX, where X can be a material selected from Ag, Cu, and combinations thereof. In some aspects, the sub-layers of the MRL structure 320 may be made of a CoPtX alloy, where X can be a material selected from Ag, Cu, and combinations thereof. In some examples, each of the sub-layers of the MRL structure 320 may have a predetermined thickness, granular structure, small grain size, desired uniformity, high coercivity, high magnetic flux, and good atomic ordering, as would be appropriate for HAMR media. Other additive elements may be added to the aforementioned MRL structure 320 including, e.g., Au or Ni. In other embodiments, there may be different numbers of MRL other than four in MRL structure 320.

In some embodiments, the sub-layers or magnetic layers of the MRL structure 320 can be different in their compositions, thicknesses, and/or segregants. In one example, the MRL structure 320 may include a first magnetic recording layer 328 (sub-layer MAG0), a second magnetic recording layer 330 (sub-layer MAG1) on MAG0, a third magnetic recording layer 332 (sub-layer MAG2) on MAG1, and a fourth magnetic recording layer 334 (sub-layer MAG3) on MAG2. In one example, MAG1 may have a thickness greater than MAG0. In other examples, the MRL structure 320 may have more than or less than four magnetic recording sub-layers. In one embodiment, MAG1 (second magnetic recording layer 330) may include FePt—Ag—Cu—X. In some examples, X can be a magnetic grain segregant including BN or a combination of BN and C. In some examples, X can include B4C. The use of BN segregants (e.g., in sub-layer MAG1) allows the thickness of the underlayer (e.g., MgO underlayer 318) to be reduced which can lead to an increased thermal gradient, as compared to a HAMR medium that does not use BN (or B4C) as a segregant in an otherwise identical MRL structure (e.g., identical other than the use of a non-BN segregant). While not bound by any theory, it is believed that BN when used in the second magnetic recording layer (MAG1) may react with Ti (e.g., from an MTO underlayer) that escaped from a lower MTO layer to form TiN, instead of affecting the FePt of the magnetic layer. Otherwise, using B alone may react with FePt (e.g., forming FeB) and thereby reduce the recording performance of the magnetic layers. In various embodiments, MAG1 may have various compositions of Fe, Pt, Ag, Cu, C, and BN. The use of BN as segregants in the MRL structure 320 (e.g., in MAG1) enables a reduction of the thickness of the MgO layer 318 such that the thermal gradient and ADC of the medium 300 can be improved while without significantly affecting magnetic film growth on the underlayer structure 314 (e.g., on MgO layer 318).

In one embodiment, MAG1 may have between about 34 mol % and about 42 mol % of BN. In some examples, MAG1 may have between about 0 mol % and about 10 mol % of C. In some examples, other magnetic recording layers (e.g., MAG0, MAG2, and/or MAG3) can have the same or different segregants such as Ag, SiO2, C, BN, combinations thereof, and/or other suitable materials known in the art. In some examples, MAG0 may not include a BN segregant. In one embodiment, MAG1 can have a composition including FePtAgCu-10C-34BN. In one embodiment, MAG1 can have a composition including FePtAgCu-5C-37.4BN. In one embodiment, MAG1 can have a composition including FePtAgCu-41BN. In one embodiment, MAG1 has a BN-based segregant without carbon (C).

In some aspects, the capping layer 322 may be made of Co, Pt, Pd, combinations thereof, and/or other suitable materials known in the art. In one example, the capping layer 322 can be a bi-layer structure having a top layer including Co and a bottom layer including Pt or Pd. In addition to the Co/Pt and Co/Pd combinations of the top layer and the bottom layer, specific combinations of the top layer materials and the bottom layer materials may include, for example, Co/Au, Co/Ag, Co/Al, Co/Cu, Co/Ir, Co/Mo, Co/Ni, Co/Os, Co/Ru, Co/Ti, Co/V, Fe/Ag, Fe/Au, Fe/Cu, Fe/Mo, Fe/Pd, Ni/Au, Ni/Cu, Ni/Mo, Ni/Pd, Ni/Re, etc. In additional examples, top layer materials and bottom layer materials include any combination of Pt and Pd (e.g., alloys), or any of the following elements, alone or in combination: Au, Ag, Al, Cu, Ir, Mo, Ni, Os, Ru, Ti, V, Fe, Re, and the like. In some aspects, the overcoat layer 324 may be made of carbon. In one aspect, the lubricant layer 326 may be made of a polymer-based lubricant.

The terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

In some embodiments, the HAMR medium 300 may have a higher areal density (e.g., ADC), comparable or better signal-to-noise ratio (SNR), and/or improved thermal gradient than a HAMR medium (control medium) that has a similar structure but does not use BN-based segregants in a magnetic recording layer (e.g., MAG1).

Figure 4:
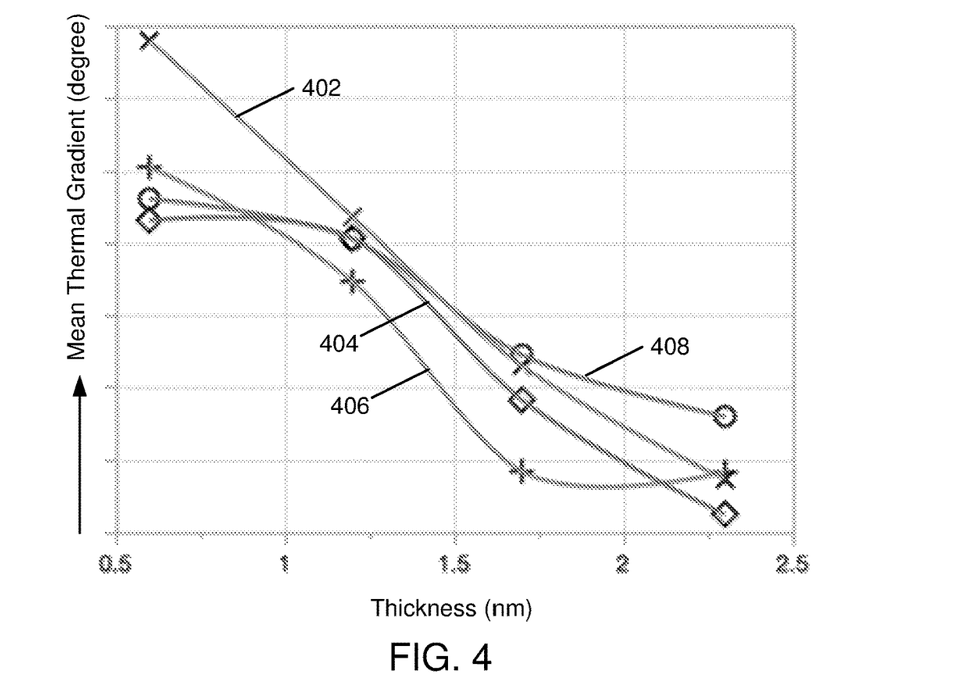
FIG. 4 is a chart of thermal gradient test results of exemplary HAMR media and a control medium in accordance with some aspects of the disclosure.

FIG. 4 illustrates the thermal gradient test results of exemplary HAMR media (e.g., HAMR medium 300) using BN-based segregants and a control medium. More specifically, FIG. 4 illustrates a graph of a mean thermal gradient (Kelvin per nanometer (K/nm)) of the media (vertical axis) versus a thickness of the MgO underlayer (horizontal axis) for three HAMR test media and the control medium. In FIG. 4, curves 402, 404, and 406 correspond to the test data of three different HAMR media using BN-based segregants. More specifically, curve 406 corresponds to a HAMR medium using BN-based segregants that was fabricated without using a reactive gas. Curves 402 and 404 correspond to two other HAMR media using BN-based segregants that were fabricated using a reactive gas at different flow rates. Curve 408 corresponds to the test data of the control medium that does not use BN-based segregants. In this example, the HAMR medium (e.g., HAMR medium 300 with BN-based segregants and fabricated using a reactive gas with the higher flow rate) corresponding to curve 402 has a greater thermal gradient as compared to that of the control medium when the MgO underlayer thickness decreases. The other HAMR media (e.g., for curves 404 and 406) do not perform as well as the media of curve 402. A higher thermal gradient can improve the areal density (e.g., ADC) of HAMR media. In general, the thermal gradient of HAMR media improves as the MgO underlayer gets thinner. However, reducing MgO underlayer thickness can adversely affect the magnetic performance (e.g., signal-to-noise ratio) of the media. The disclosed HAMR media with BN-based segregants (in particular HAMR media with BN-based segregants and fabricated using a reactive gas) enable the use of a thinner MgO underlayer (or without a MgO underlayer) without significantly compromising magnetic performance as illustrated and described with FIGS. 6 and 7 below.

Figure 5:
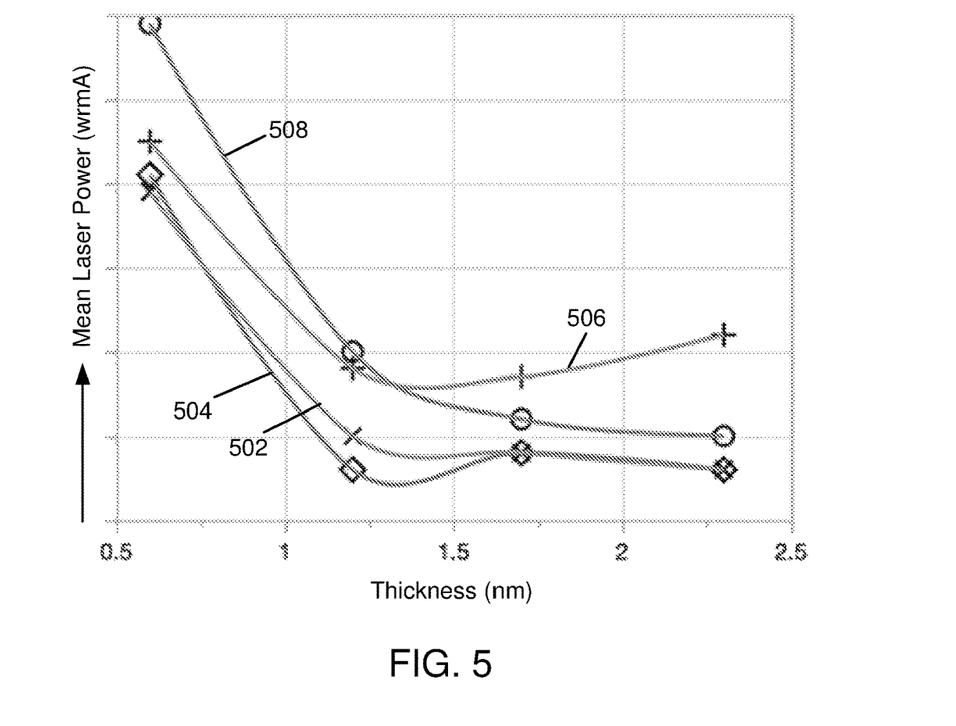
FIG. 5 is a chart of laser power test results of exemplary HAMR media and a control medium in accordance with some aspects of the disclosure.

FIG. 5 illustrates the laser power test results of the exemplary HAMR media (e.g., HAMR medium 300) of FIG. 4. More specifically, FIG. 5 illustrates a graph of a mean laser power applied to the media (vertical axis (milliampere (mA)), and applied via a slider during a write operation) versus a thickness of the MgO underlayer (horizontal axis) for the three HAMR test media and control medium. In FIG. 5, curves 502, 504, and 506 correspond to the test data of the three different HAMR media using BN-based segregants. More specifically, curve 506 corresponds to a HAMR medium using BN-based segregants that was fabricated without using a reactive gas. Curves 502 and 504 correspond to the other two HAMR media with BN-based segregants that were fabricated using a reactive gas at different flow rates. Curve 508 corresponds to the test data of the control medium that does not use BN-based segregants. FIG. 5 shows that when compared to the control medium, the test HAMR media (e.g., HAMR medium 300 with BN-based segregants and fabricated using a reactive gas with the higher flow rate) corresponding to curve 502 has a higher thermal gradient (as shown in FIG. 4) without significantly increasing laser current (in fact it is decreased) when the MgO underlayer thickness is about 1 nm or above (e.g., about 1.3 nm). FIG. 5 further shows that the HAMR media with BN-based segregants and fabricated using a reactive gas (e.g., for curves 502 and 504) perform better than that of curve 506, corresponding to the HAMR medium using BN-based segregants that was fabricated without using a reactive gas.

Figure 6:
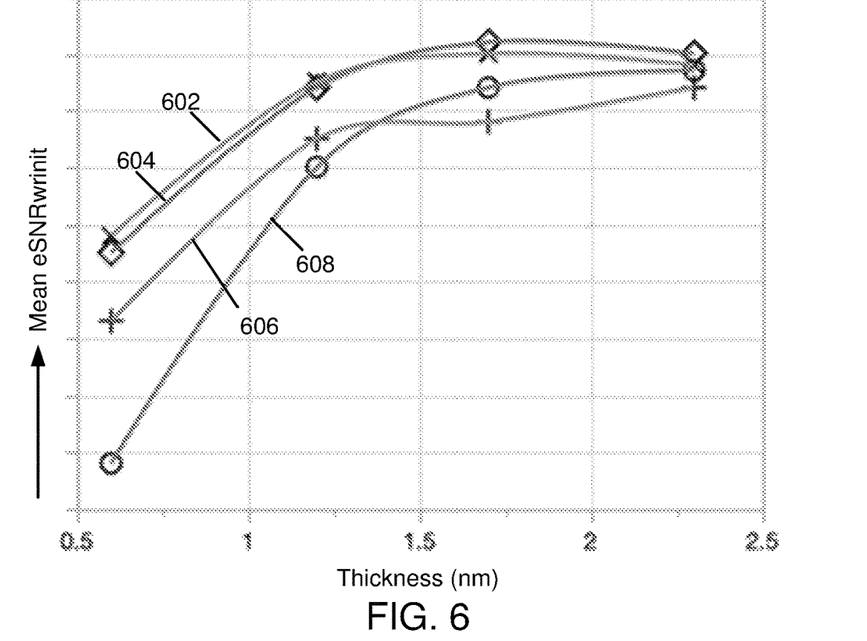
FIGS. 6 and 7 are charts of signal-to-noise ratio (SNR) performance of the exemplary HAMR media and the control medium.
Figure 7:
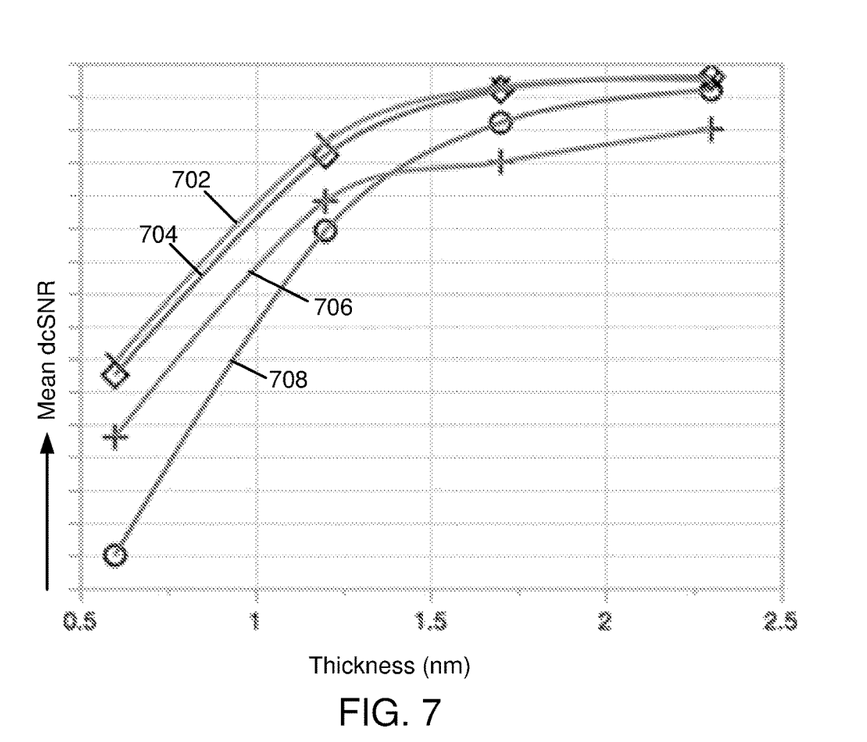

FIGS. 6 and 7 are charts that illustrate signal-to-noise ratio (SNR) performance of the exemplary HAMR media (e.g., HAMR medium 300) and the control medium of FIGS. 4 and 5. More specifically, FIG. 6 illustrates a graph of a mean eSNRwrinit of the media (vertical axis) versus a thickness of the MgO underlayer (horizontal axis) for the three HAMR test media and the control medium. The measurement eSNRwrinit refers to a signal-to-noise ratio of a readback signal localized at the transitions (1 to 0 or vice versa) in the recording pattern. In FIG. 6, curves 602, 604, and 606 correspond to the test data of the three different HAMR media using BN-based segregants. More specifically, curve 606 corresponds to the HAMR medium using BN-based segregants that was fabricated without using a reactive gas. Curves 602 and 604 correspond to the other two HAMR media using BN-based segregants that were fabricated using a reactive gas at different flow rates. Curve 608 corresponds to the test data of the control medium that does not use BN-based segregants.

FIG. 7 illustrates a graph of a mean dcSNR of the media (vertical axis) versus a thickness of the MgO underlayer (horizontal axis) for the three HAMR test media and the control medium. The measurement dcSNR refers to a signal-to-noise ratio of readback signal uniform independent of the recording pattern. In FIG. 7, curves 702, 704, and 706 correspond to the test data of the three different HAMR media using BN-based segregants. More specifically, curve 706 corresponds to the HAMR test medium using BN-based segregants that was fabricated without using a reactive gas. Curves 702 and 704 correspond to the other two test HAMR media using BN-based segregants that were fabricated using a reactive gas at different flow rates. Curve 708 corresponds to the test data of the control medium that does not use BN-based segregants.

As illustrated in FIGS. 6 and 7, the test HAMR media (e.g., HAMR medium 300 with BN-based segregants and fabricated using a reactive gas with the higher flow rate) corresponding to curves 602 and 702 has better SNR performance (e.g., eSNRwrinit and dcSNR) as compared to that of the control medium when the MgO underlayer thickness decreases. The other test HAMR media (e.g., for curves 606 and 706) do not perform as well as that of curves 602, 604, 702, and 704. The SNR performance of the control medium corresponding to curves 608 and 708 degrades more quickly than the HAMR media using BN-based segregants as the thickness of the MgO layer decreases. In one example, the control medium can use carbon-based segregants in a magnetic layer, and the HAMR media can use BN-based segregants in a magnetic recording layer (e.g., MAG1, 330).

Figure 8:
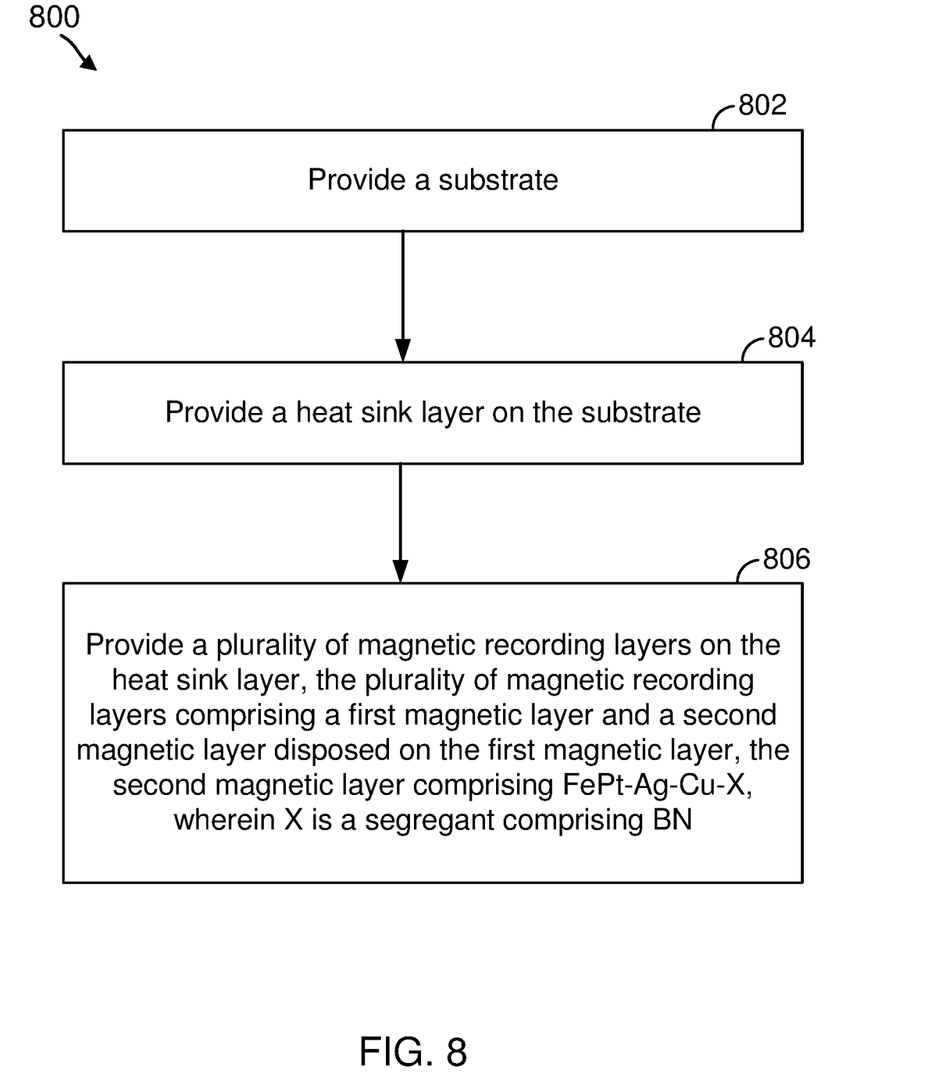
FIG. 8 is a flowchart of a process for fabricating a HAMR medium in accordance with some aspects of the disclosure.

FIG. 8 is a flowchart of a process 800 for fabricating a HAMR medium with BN-based segregants in accordance with some aspects of the disclosure. In one aspect, the process 800 can be used or modified to fabricate any of the HAMR media described above in relation to FIGS. 3-7. At 802, the process provides a substrate (e.g., deposits suitable substrate materials). In some aspects, the substrate can be made of one or more materials such as an Al alloy, NiP plated Al, glass, glass ceramic, combinations thereof, and/or any suitable materials known in the art.

At 804, the process 800 further provides a heat sink layer (e.g., deposits a heat sink layer 310) on the substrate. In one aspect, the process 800 may further provide an underlayer (e.g., deposits an underlayer structure 314) on the heat sink layer. In one example, the underlayer may contain an MTO underlayer and a MgO underlayer. In one aspect, the MgO underlayer has a thickness between about 1.1 nm and about 2.3 nm.

At 806, the process provides a plurality of magnetic recording layers (e.g., deposits two or more magnetic recording layers) on the heat sink layer. In some aspects, the process may also provide/deposit an adhesion layer, an SUL, a seed layer, and/or a thermal resistance layer on the substrate, before providing/depositing the magnetic recording layers (e.g., MRL structure 320). In one example, the plurality of magnetic recording layers may include one or more magnetic recording layers for storing data magnetically. In one embodiment, the plurality of magnetic recording layers include a first magnetic layer (e.g., MAG0, 328) and a second magnetic layer (e.g., MAG1, 330) disposed on the first magnetic layer. The second magnetic layer can include FePt—Ag—Cu—X. Here, X is a segregant including BN (e.g., BN-based segregants, a combination of B and C segregants, etc.). In one embodiment, the second magnetic layer is directly on the first magnetic layer, the first magnetic layer is directly on the MgO underlayer, and the MgO underlayer is directly on the MTO underlayer. The use of the BN segregant enables the thickness of the MgO underlayer to be reduced (e.g., up to about 25 percent) as compared to a HAMR medium with a similar structure that does not include a BN segregant in the MRL structure.

In one embodiment, the process can form one or more layers of the HAMR 300 using sputtering. In one example, the process can use a reactive sputtering process to form one or more FePt—Ag—Cu—X magnetic recording layers. A FePt—Ag—Cu—X target can be reactively sputtered with a reactive gas to produce the magnetic recording layer containing FePt—Ag—Cu—X. In one example, the reactive sputtering process can be performed using a reactive gas.

Figure 9:
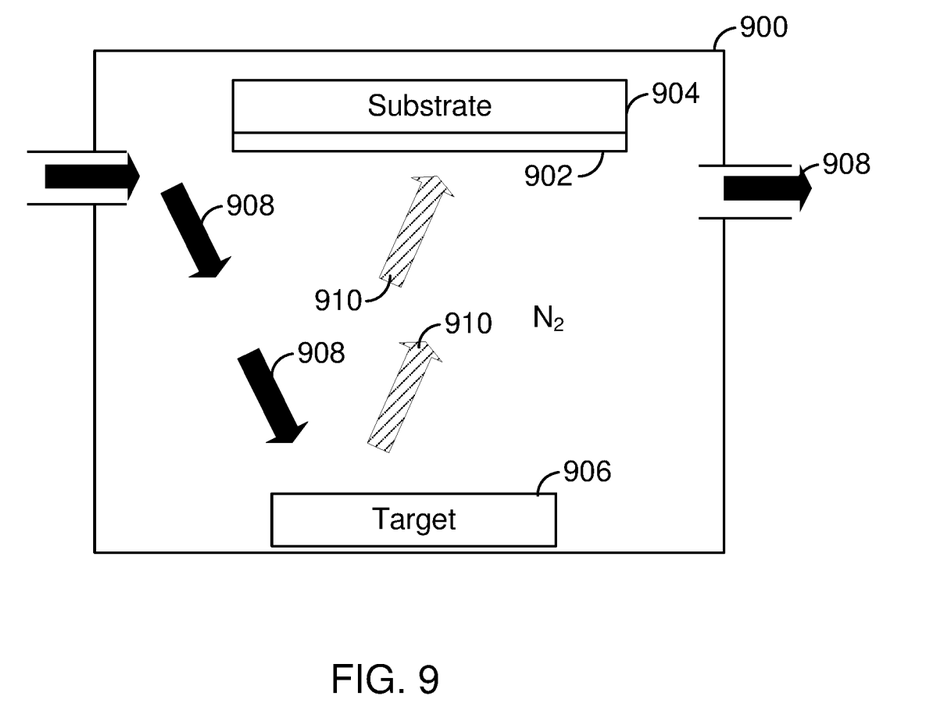
FIG. 9 is a drawing illustrating a sputtering apparatus for fabricating the HAMR medium of FIG. 3.

FIG. 9 is a drawing illustrating a reactive sputtering apparatus 900 for fabricating a magnetic recording medium using reactive sputtering in accordance with some aspects of the disclosure. In one example, the apparatus 900 may be used to fabricate the HAMR media 300 described above using the process 800. The apparatus 900 can be used to deposit a film 902 on a substrate 904. For example, the film 902 may be the FePt—Ag—Cu—X magnetic layer or MAG1 (e.g., FePt—Ag—Cu—C—BN or FePt—Ag—Cu—BN) described above. In one example, the FePt—Ag—Cu—X magnetic layer may include FePtAgCu-10C-34B, FePtAgCu-5C-37.4BN, or FePtAgCu-41BN. In some embodiments, the FePt—Ag—Cu—X magnetic layer has between about 34 mole percent (mol %) and about 42 mol % of BN, inclusive. To that end, a target 906 of the desired material for forming the film 902 can be used in the apparatus 900. Inside the apparatus 900, a reactive gas is introduced into a plasma formed by an inert gas 908 (e.g., argon, xenon, or krypton). The reactive gas is activated by the plasma and can chemically react with the sputtered target material 910 which is subsequently deposited as the film 902 on the substrate 904. During the deposition of the film 902, the substrate 904 and the target 906 can be biased with a suitable voltage for facilitating the sputtering of the film 902.

In one aspect, the process can perform the sequence of actions in a different order. In another aspect, the process can skip one or more of the actions. In other aspects, one or more of the actions are performed simultaneously. In some aspects, additional actions can be performed.

In several aspects, the deposition of such layers can be performed using a variety of deposition sub-processes, including, but not limited to physical vapor deposition (PVD), sputter deposition and ion beam deposition, and chemical vapor deposition (CVD) including plasma-enhanced chemical vapor deposition (PECVD), low pressure chemical vapor deposition (LPCVD) and atomic layer chemical vapor deposition (ALCVD). In other aspects, other suitable deposition techniques known in the art may also be used.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X", as used in the disclosure shall mean within 10 percent of the 'value X'. For example, a value of about 1 or approximately 1, would mean a value in a range of 0.9-1.1. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," an variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A magnetic recording medium comprising:
   a substrate;
   a heat sink layer on the substrate;
   a underlayer structure on the heat sink layer, comprising:
      a first underlayer comprising MgOTiO; and
      a second underlayer comprising MgO directly on the first underlayer, the first underlayer and the second underlayer being different in their respective compositions; and
   a plurality of magnetic recording layers directly on the underlayer structure, the plurality of magnetic recording layers comprising a first magnetic layer and a second magnetic layer disposed on the first magnetic layer, the first magnetic layer and the second magnetic layer being different in respective compositions, the first magnetic layer comprising FePt—Ag, and the second magnetic layer comprising FePt—Ag—Cu—X, wherein X is a segregant comprising BN.

2. The magnetic recording medium of claim 1, wherein an amount of BN in the segregant is between 34 mole percent (mol %) and 42 mol %, inclusive.

3. The magnetic recording medium of claim 2, wherein an amount of carbon (C) in the segregant is between 0 mole percent (mol %) and 10 mol %, inclusive.

4. The magnetic recording medium of claim 1,
wherein the second underlayer has a thickness between about 1.1 nanometers (nm) and about 2.3 nm.

5. The magnetic recording medium of claim 4, wherein the second magnetic layer is directly on the first magnetic layer, the first magnetic layer is directly on the second underlayer, and the second underlayer is directly on the first underlayer.

6. The magnetic recording medium of claim 1, wherein the composition of the second magnetic layer is one of: FePtAgCu-10C-34BN, FePtAgCu-5C-37.4BN, or FePtAgCu-41BN.

7. The magnetic recording medium of claim 1, wherein the second magnetic layer has a thickness greater than that of the first magnetic layer.

8. The magnetic recording medium of claim 1, wherein the plurality of magnetic recording layers further comprise:
a third magnetic layer disposed on the second magnetic layer; and
a fourth magnetic layer disposed on the third magnetic layer,
the first magnetic layer, the second magnetic layer, the third magnetic layer, and the fourth magnetic layer are different in respective compositions.

9. The magnetic recording medium of claim 8, wherein:
the second magnetic layer comprises FePt—Ag—Cu—C—BN;
the third magnetic layer comprises FePt—BN—C; and
the fourth magnetic layer comprises FePt—BN—SiO2.

10. A data storage device comprising:
the magnetic recording medium of claim 1; and
a write head configured to write data to the magnetic recording medium.

11. A method for manufacturing a magnetic recording medium, the method comprising:
providing a substrate;
providing a heat sink layer on the substrate;
providing a underlayer structure on the heat sink layer, comprising:
a first underlayer comprising MgOTiO; and
a second underlayer comprising MgO directly on the first underlayer, the first underlayer and the second underlayer being different in their respective compositions; and
providing a plurality of magnetic recording layers directly on the underlayer structure, the plurality of magnetic recording layers comprising a first magnetic layer and a second magnetic layer disposed on the first magnetic layer, the first magnetic layer and the second magnetic layer being different in respective compositions, the first magnetic layer comprising FePt—Ag, and the second magnetic layer comprising FePt—Ag—Cu—X, wherein X is a segregant comprising BN.

12. The method of claim 11, wherein an amount of BN in the segregant is between 34 mole percent (mol %) and 42 mol %, inclusive.

13. The method of claim 12, wherein an amount of carbon (C) in the segregant is between 0 mol % and 10 mol %, inclusive.

14. The method of claim 11,
wherein the second underlayer has a thickness between about 1.1 nanometers (nm) and about 2.3 nm.

15. The method of claim 14, wherein the second magnetic layer is directly on the first magnetic layer, the first magnetic layer is directly on the second underlayer, and the second underlayer is directly on the first underlayer.

16. The method of claim 11, wherein the composition of the second magnetic layer is one of: FePtAgCu-10C-34BN, FePtAgCu-5C-37.4BN, or FePtAgCu-41BN.

17. The method of claim 11, wherein the second magnetic layer has a thickness greater than that of the first magnetic layer.

18. The method of claim 11, wherein the providing the plurality of magnetic recording layers further comprises:
depositing a third magnetic layer on the second magnetic layer; and
depositing a fourth magnetic layer on the third magnetic layer,
the first magnetic layer, the second magnetic layer, the third magnetic layer, and the fourth magnetic layer are different in respective compositions.

19. A magnetic recording medium comprising:
a substrate;
a heat sink layer on the substrate;
a underlayer structure on the heat sink layer, comprising:
a first underlayer comprising MgOTiO; and
a second underlayer comprising MgO directly on the first underlayer, the first underlayer and the second underlayer being different in their respective compositions; and
a plurality of magnetic recording layers directly on the underlayer structure, the plurality of magnetic recording layers comprising a first magnetic layer and a second magnetic layer disposed on the first magnetic layer, the first magnetic layer and the second magnetic layer being different in respective compositions, the first magnetic layer comprising FePt—Ag, and the second magnetic layer comprising FePt—Ag—Cu—X, wherein X is a segregant comprising B4C.

20. The magnetic recording medium of claim 1, wherein:
the first underlayer consists of MgOTiO; and
the second underlayer consists of MgO.

* * * * *